United States Patent
Minami et al.

(10) Patent No.: US 9,203,115 B2
(45) Date of Patent: Dec. 1, 2015

(54) METHOD OF MANUFACTURING NONAQUEOUS ELECTROLYTE SECONDARY BATTERY

(71) Applicant: SANYO Electric Co., Ltd., Moriguchi-shi, Osaka (JP)

(72) Inventors: Keisuke Minami, Kanzaki-gun (JP); Toyoki Fujihara, Kanzaki-gun (JP); Toshiyuki Nohma, Kakogawa (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 114 days.

(21) Appl. No.: 13/962,070

(22) Filed: Aug. 8, 2013

(65) Prior Publication Data
US 2014/0041209 A1  Feb. 13, 2014

(30) Foreign Application Priority Data
Aug. 9, 2012  (JP) .................................. 2012-177490

(51) Int. Cl.
| | | |
|---|---|---|
| *H01M 10/058* | (2010.01) | |
| *H01M 10/0525* | (2010.01) | |
| *H01M 10/0567* | (2010.01) | |
| *H01M 4/505* | (2010.01) | |
| *H01M 4/525* | (2010.01) | |
| *H01M 4/587* | (2010.01) | |
| *H01M 10/44* | (2006.01) | |

(52) U.S. Cl.
CPC ........ *H01M 10/058* (2013.01); *H01M 10/0525* (2013.01); *H01M 10/0567* (2013.01); *H01M 10/446* (2013.01); *H01M 4/505* (2013.01); *H01M 4/525* (2013.01); *H01M 4/587* (2013.01); *Y02E 60/122* (2013.01); *Y10T 29/49108* (2015.01)

(58) Field of Classification Search
None
See application file for complete search history.

(56) References Cited

U.S. PATENT DOCUMENTS

2010/0015514 A1* 1/2010 Miyagi et al. ................. 429/129

FOREIGN PATENT DOCUMENTS

JP  2007-141830 A  6/2007

* cited by examiner

*Primary Examiner* — Barbara Gilliam
*Assistant Examiner* — Angela Martin
(74) *Attorney, Agent, or Firm* — Westerman, Hattori, Daniels & Adrian, LLP

(57) ABSTRACT

Provided is a method of manufacturing a nonaqueous electrolyte secondary battery. The method includes: forming an electrode assembly including a positive electrode plate and a negative electrode plate disposed with a separator interposed therebetween; arranging the electrode assembly and a nonaqueous electrolyte containing LiBOB (lithium bis(oxalato) borate) and $LiPF_2O_2$ (lithium difluorophosphate) inside an outer body; and configuring the concentration of the LiBOB to be larger than that of the $LiPF_2O_2$ and to be smaller than that of the $LiPF_2O_2$ by charge and discharge.

9 Claims, 3 Drawing Sheets

METHOD OF MANUFACTURING NONAQUEOUS ELECTROLYTE SECONDARY BATTERY

TECHNICAL FIELD

The present invention relates to a method of manufacturing a nonaqueous electrolyte secondary battery.

BACKGROUND ART

In recent years, exhaust controls on carbon dioxide gas and other substances have become stricter as actions to safeguard the environment are increased. In the motor vehicle industry, therefore, the development of electric vehicles (EVs) and hybrid electric vehicles (HEVs) has become accelerated as a substitute for vehicles using fossil fuel such as gasoline, diesel oil, and natural gas. Nickel-hydrogen secondary batteries and lithium-ion secondary batteries have been used as batteries for EVs and HEVs. In recent years, nonaqueous electrolyte secondary batteries such as lithium-ion secondary batteries have been used more often because of their light weight and high capacity. For such a nonaqueous electrolyte secondary battery, an outer body of aluminum-laminated film is proposed because it enables an easy increase in size and decrease of the cost of material.

It is required for the batteries for EVs and HEVs to respond to the improvement of basic performance for automobiles, namely, driving performance such as accelerating performance and hill-climbing performance, as well as environmental friendliness. Furthermore, it is required to prevent degradation of the driving performance even in severe environments (usage in very cold areas and very hot areas).

It has been proposed to add vinylene carbonate and difluorophosphate to a nonaqueous electrolyte in order to improve low-temperature discharge characteristics of the nonaqueous electrolyte secondary battery (refer to JP-A-2007-141830).

However, batteries for EVs and HEVs are used in various kinds of environments, which require further improvement.

SUMMARY

An advantage of some aspects of the invention is to provide a method of manufacturing a nonaqueous electrolyte secondary battery. The method includes: forming an electrode assembly including a positive electrode plate and a negative electrode plate disposed with a separator interposed therebetween; arranging the electrode assembly and a nonaqueous electrolyte containing LiBOB (lithium bis(oxalato)borate) and $LiPF_2O_2$ (lithium difluorophosphate) inside an outer body; and configuring the concentration of the LiBOB to be larger than that of the $LiPF_2O_2$ and to be smaller than that of the $LiPF_2O_2$ by charge and discharge.

The invention provides a nonaqueous electrolyte secondary battery suitable for EVs and HEVs.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
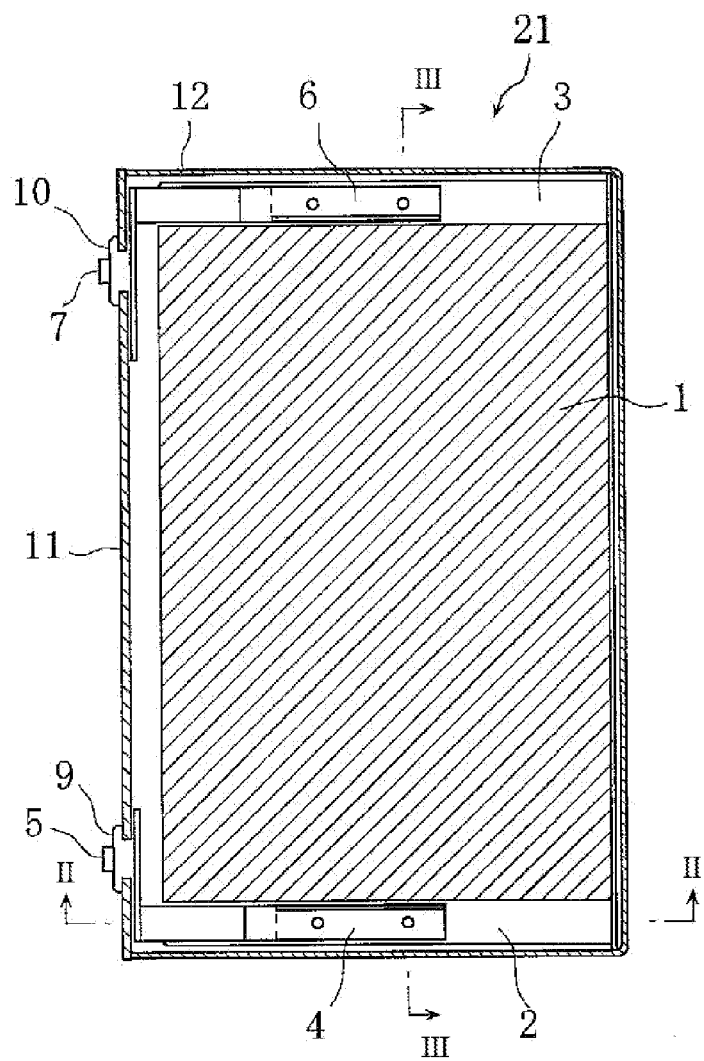
FIG. 1 is a sectional view illustrating an example of a modification of a nonaqueous electrolyte secondary battery.

According to an embodiment of the invention, a method of manufacturing a nonaqueous electrolyte secondary battery includes: forming an electrode assembly including a positive electrode plate and a negative electrode plate disposed with a separator interposed therebetween; arranging the electrode assembly and a nonaqueous electrolyte containing LiBOB (lithium bis(oxalato)borate) and $LiPF_2O_2$ (lithium difluorophosphate) inside an outer body; and configuring the concentration of the LiBOB to be larger than that of the $LiPF_2O_2$ and to be smaller than that of the $LiPF_2O_2$ by charge and discharge.

In a case of adding LiBOB to the nonaqueous electrolyte, a covering (SEI) of decomposition products is formed on the surface of a negative electrode active material and serves as a protective film for the negative electrode active material. This can prevent degradation of the negative electrode even in a case of repeatedly performing a charge-discharge cycle and improves the cycling characteristics. However, an excessive additive amount of LiBOB increases the concentration of lithium salt in the battery, resulting in decrease of the low-temperature characteristics in particular. $LiPF_2O_2$ is therefore added to improve the low-temperature characteristics.

However, the improvement of the cycling characteristics and low-temperature characteristics cannot be achieved sufficiently by merely adding $LiPF_2O_2$ to the nonaqueous electrolyte. As a result of examination, the inventors have found that the cycling characteristics and low-temperature characteristics can be dramatically improved by a configuration where the concentration of LiBOB is larger than that of $LiPF_2O_2$ before a charge and discharge and the concentration of the LiBOB is smaller than that of the $LiPF_2O_2$ after the end of the charge and discharge. Specifically, the battery contains a sufficient amount of LiBOB therein in a configuration where the concentration of LiBOB is larger than that of $LiPF_2O_2$ before a charge and discharge. This leads to a sufficient covering formed on the surface of the negative electrode active material. Meanwhile, an increase of the concentration of lithium salt in the battery can be prevented by a configuration where the concentration of the LiBOB is smaller than that of the $LiPF_2O_2$ after the end of the charge and discharge. Consequently, the effect of adding $LiPF_2O_2$ can be exerted, and the low-temperature characteristics can be dramatically improved.

Preferably, the charge and discharge is performed under a condition in which a constant current charge is performed to 4.0 to 4.3 V at a charging current of 0.05 to 10 It and then a discharge is performed to 2.0 to 3.0 V at a discharging current of 0.05 to 10 It.

Preferably, the concentration of the LiBOB before the charge and discharge is 0.05 to 0.15 mol/L, and the concentration of the LiBOB after the end of the charge and discharge is less than 0.01 mol/L. Preferably, the concentration of the $LiPF_2O_2$ after the end of the charge and discharge is 0.01 to 0.1 mol/L.

Preferably, the proportion of the nonaqueous electrolyte to a negative electrode active material contained in the negative electrode plate is 0.5 to 2.5 mL/g. Preferably, the negative electrode plate contains carbon as a negative electrode active material, and the positive electrode plate contains a lithium-containing transition metal compound as a positive electrode active material. More preferably, the negative electrode active material contains graphite as the carbon, and the positive electrode active material contains lithium-nickel-cobalt manganese oxide as the lithium-containing transition metal compound.

Other Matters (1) The positive electrode active material in the invention may be any material as long as it can absorb and desorb lithium, and may be a lithium-containing transition metal compound having a layer structure, a spinel structure, or an olivin structure, for example. Above all, it is preferable to use a lithium-containing transition metal compound having a layer structure, in view of the high density of energy. Such lithium-containing transition metal compounds include a lithium-nickel composite oxide, lithium-nickel-cobalt composite oxide, lithium-nickel-cobalt-aluminum composite oxide, lithium-nickel-cobalt-manganese composite oxide, and lithium-cobalt composite oxide. Alternatively, a mixture of two or more kinds of composite oxides may be used; for example, a mixture of a layered lithium composite oxide containing nickel and a spinel lithium-manganese oxide. The lithium-containing transition metal compound may contain manganese (Mn) and cobalt (Co) in addition to nickel (Ni), and may further contain at least one selected from the group consisting of boron (B), fluorine (F), magnesium (Mg), aluminum (Al), titanium (Ti), chromium (Cr), vanadium (V), iron (Fe), copper (Cu), zinc (Zn), niobium (Nb), molybdenum (Mo), tantalum (Ta), zirconium (Zr), tin (Sn), tungsten (W), sodium (Na), potassium (K), barium (Ba), strontium (Sr), and calcium (Ca).

(2) The negative electrode active material of the invention may be a negative electrode active material generally used, and in particular, may be a carbon material capable of absorbing and desorbing lithium, or a metal capable of alloying with lithium or an alloy compound containing such a metal.

Such carbon materials include graphite such as natural graphite, non-graphitizable carbon, and artificial graphite, and cokes. An example of the alloy compound is one containing at least one of the metals capable of alloying with lithium. In particular, silicon or tin is preferable as a metal capable of alloying with lithium, and it is possible to use silicon or tin combined with oxygen, namely, silicon oxide or tin oxide, for example. It is also possible to use a mixture of a carbon material as above and a compound of silicon or tin.

It is also possible to use a material, such as lithium titan oxide, that provides a higher potential with respect to metal lithium than a material such as carbon material although the density of energy would decrease. In addition, the surface of the negative electrode active material may be covered with amorphous carbon.

(3) A solvent of the nonaqueous electrolyte in the invention is not limited in any way, and any solvent generally used for a nonaqueous electrolyte secondary battery can be used. The following shows examples of such a solvent: a cyclic carbonate such as ethylene carbonate, propylene carbonate, butylene carbonate, vinylene carbonate, and fluoroethylene carbonate; a chained carbonate such as dimethyl carbonate, methylethyl carbonate, and diethyl carbonate; a compound containing an ester such as methyl acetate, ethyl acetate, propyl acetate, methyl propionate, and γ-butyrolactone; a compound having a sulfone group, such as propane sultone; a compound containing an ether such as 1,2-dimethoxyethane, 1,2-diethoxyethane, tetrahydrofuran, 1,2-dioxane, 1,4-dioxane, and 2-methyltetrahydrofuran; a compound containing a nitrile such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and a compound containing an amide such as dimethylformamide. Such materials may be used alone, or a combination of some of them may be used. In particular, it is preferable to use a solvent formed by combining a cyclic carbonate and a chained carbonate.

Lithium salt as a solute may be a material generally used, for example, $LiPF_6$, $LiBF_4$, $LiN(SO_2CF_3)$, $LiN(SO_2C_2F_5)_2$, and $LiPF_{6-x}(C_nF_{2n-1})_x$ (where $1<x<6$, $n=1$ or 2). Such materials may be used alone, or a mixture of two of them or more may be used. The concentration of the lithium salt as a solute is not limited in particular, but is preferably 0.8 to 1.4 mol to one liter of the electrolyte.

(4) A layer of inorganic filler generally used may be formed in the interface between the positive electrode plate and the separator and the interface between the negative electrode plate and the separator. The following shows examples of the filler: an oxide or phosphate compound using one or more of titanium, aluminum, silicon, magnesium, and other elements; or those having the surface treated with a hydroxide, for example.

The filler layer may be formed, for example, by a method in which a filler-containing slurry is directly applied to the positive electrode plate, the negative electrode plate, or the separator, or by a method in which a sheet containing filler is attached to the positive electrode plate, the negative electrode plate, or the separator.

(5) A separator generally used may be used for the separator of the invention. The following shows specific examples of the separator of the invention: a separator containing polyethylene; a separator in which a layer containing polypropylene is formed on a polyethylene layer; and a polyethylene separator onto which a resin such as aramid resin is applied.

(6) A stacked electrode assembly as well as a wound electrode assembly may be used as the electrode assembly.

EXAMPLE

The following describes the invention in further detail on the basis of a specific example. However, the invention is not limited in any way to the following example, and can be implemented by modifying as appropriate as long as its summary is not changed.

Fabrication of a Positive Electrode Plate

A positive electrode active material represented by $LiNi_{0.35}Co_{0.35}Mn_{0.30}O_2$ and having a layer structure, carbon black as a conductive agent, and PVDF (polyvinylidene fluoride) as a binding agent were kneaded in a solution of N-methyl-2-pyrrolidone to prepare a positive electrode mixture slurry. In preparing the positive electrode mixture slurry, the mass ratio of the positive electrode active material, the carbon black, and the PVDF was 88:9:3. Next, the positive electrode mixture slurry was applied to both sides of a positive electrode collector of a belt-shaped aluminum foil. The resultant object was dried and then extended by applying pressure using a roller. A positive electrode plate was thus fabricated in which a positive electrode mixture layer was formed on both sides of the positive electrode collector.

Fabrication of a Negative Electrode Plate

CMC (carboxymethyl cellulose) as a thickening agent was dissolved into water, and graphite powder as a negative electrode active material was added to the solution and mixed by stirring. Subsequently, SBR (styrene-butadiene rubber) as a binding agent was mixed to the solution, thereby preparing a negative electrode mixture slurry. In preparing the negative electrode mixture slurry, the mass ratio of the graphite, the CMC, and the SBR was 98:1:1. Next, the negative electrode mixture slurry was applied to both sides of a negative electrode collector of a belt-shaped copper foil. The resultant object was dried and then extended by applying pressure using a roller. Subsequently, a slurry was prepared by mixing alumina powder as insulating inorganic particles, a binding agent of the acrylonitrile series, and NMP at a mass ratio of 30:0.9:69.1. This slurry was applied onto the negative electrode active material layer of the plate extended and dried. This plate was dried again to remove the NMP required in the preparation of the slurry, thereby fabricating a negative electrode plate with a negative electrode protecting layer formed thereon.

Preparation of a Nonaqueous Electrolyte

Ethylene carbonate (EC) and methylethyl carbonate (MEC) were mixed at 25° C. at a volume ratio of 3:7 to obtain a mixed solvent. Lithium salt as a solute, LiPF6 was dissolved into the mixed solvent at 1.0 mol/L. Lithium salt as additives, $LiPF_2O_2$ and LiBOB (lithium bis(oxalato)borate) were added to the nonaqueous electrolyte at 0.05 mol/L and 0.1 mol/L, respectively. Vinylene carbonate (VC) was also added to the nonaqueous electrolyte so that its proportion to the nonaqueous electrolyte was 0.3% by mass.

Fabrication of a Nonaqueous Electrolyte Secondary Battery

The positive electrode plate and the negative electrode plate were disposed so as to face each other with a polyethylene separator interposed therebetween, thereby fabricating a wound electrode assembly. Subsequently, this wound electrode assembly was flattened by applying pressure thereto. Next, the positive electrode substrate exposed portion of the positive electrode plate and the positive electrode terminal were electrically connected to each other with a positive electrode collector member interposed therebetween. Meanwhile, the negative electrode substrate exposed portion of the negative electrode plate and the negative electrode terminal were electrically connected to each other with a negative electrode collector member interposed therebetween. Furthermore, the nonaqueous electrolyte was poured into the outer can (outer body). A sealing plate was crimped and fixed to an opening end of the outer can, thereby completing fabrication of a nonaqueous electrolyte secondary battery (battery capacity: 5.0 Ah).

Figure 2:
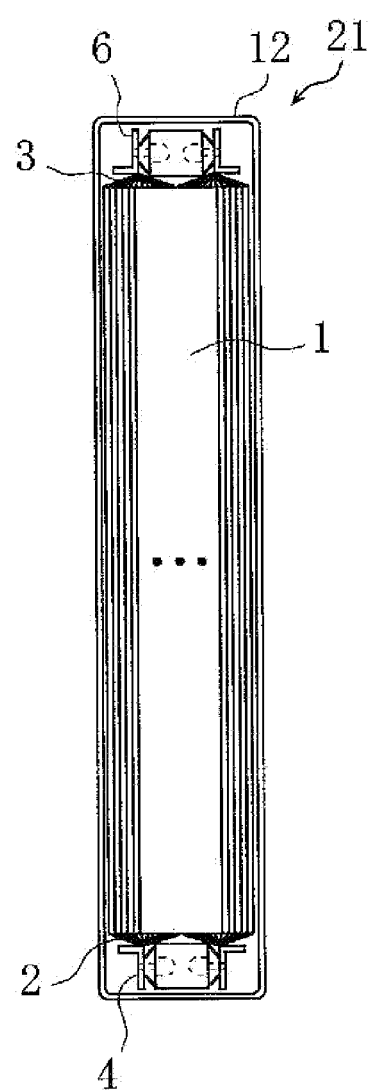
FIG. 2 is a sectional arrow view along ling II-II in FIG. 1.
Figure 3:
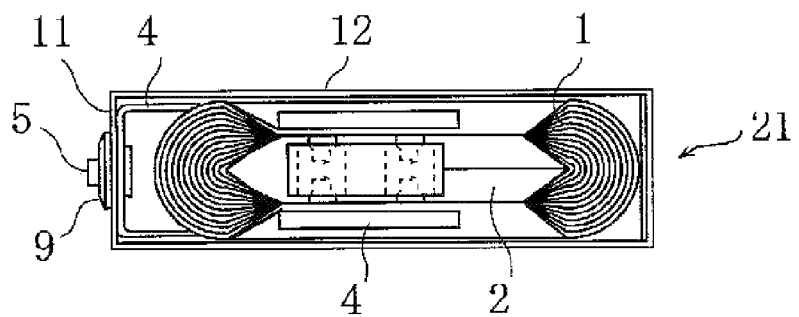
FIG. 3 is a sectional arrow view along ling in FIG. 1.

The following describes a brief structure of the nonaqueous electrolyte secondary battery. As shown in FIGS. 1 to 3, a nonaqueous electrolyte secondary battery 21 includes an outer can 12. The outer can 12 stores therein a flattened wound electrode assembly 1 formed by winding a positive electrode plate (not shown in the drawings) and a negative electrode plate (not shown in the drawings) with a separator (not shown in the drawings) interposed therebetween. The wound electrode assembly 1 includes a plurality of layers of a positive electrode substrate exposed portion 2 on one end in the winding axis direction and a plurality of layers of a negative electrode substrate exposed portion 3 on the other end. The layers of the positive electrode substrate exposed portion 2 are stacked to be connected to a positive electrode terminal 5 with a positive electrode collector member 4 interposed therebetween. Likewise, the layers of the negative electrode substrate exposed portion 3 are stacked to be connected to a negative electrode terminal 7 with a negative electrode collector member 6 interposed therebetween. The positive electrode terminal 5 and the negative electrode terminal 7 are fixed to a sealing plate 11 with insulating members 9 and 10, respectively, interposed therebetween.

The battery thus fabricated is hereinafter referred to as a battery A.

Comparative Example 1

A nonaqueous electrolyte secondary battery was fabricated in the same manner as in the example except neither $LiPF_2O_2$ nor LiBOB was added to the nonaqueous electrolyte.

The battery thus fabricated is hereinafter referred to as a battery Z1.

Comparative Example 2

A nonaqueous electrolyte secondary battery was fabricated in the same manner as in the example except $LiPF_2O_2$ was not added to the nonaqueous electrolyte.

The battery thus fabricated is hereinafter referred to as a battery Z2.

Experiment

A charge and discharge was performed under the conditions indicated below to examine the concentrations of LiBOB and $LiPF_2O_2$ in the batteries A, Z1, and Z2 after the charge and discharge. Table 1 shows the results.

Furthermore, a charge and discharge was performed under the conditions below to examine low-temperature characteristics (output characteristics in a low temperature) after a charge-discharge cycle test. Table 1 shows the results. The low-temperature outputs of the batteries A and Z2 are expressed in index numbers with the low-temperature output of the battery Z1 assumed to be 100.

Charge-Discharge Conditions for Examining the Concentrations of LiBOB and $LiPF_2O_2$ A constant current charge was performed on each of the batteries A, Z1, and Z2 at a temperature of 25° C. to 4.1 V at a charging current of 1.0 It, and then a constant voltage charge was performed at 4.1 V to a charging current of 0.05 It. Subsequently, a discharge was performed at a discharging current of 1.0 It to 2.5 V.

Charge-Discharge Conditions for Examining the Low-Temperature Characteristics after Testing Charge-Discharge Cycle A pulse charge and discharge was performed on each of the batteries A, Z1, and Z2 at a temperature of 70° C., the pulse charge and discharge in which a charge and discharge of a current of 50 It or smaller within 60 seconds at a state of charge of 50% was repeated one thousand times. After the end of the charge-discharge cycle, a charge was performed on each of the batteries A, Z1, and Z2 at a temperature of 25° C. with a charging current of 5 A to a state of charge of 50%. The batteries A, Z1, and Z2 were then cooled to −30° C., and a discharge of 10 seconds was performed for each current of 8 A, 16 A, 24 A, 32 A, 40 A, and 48 A. The voltage of each of the batteries was measured, each of the current values and the voltage of the batteries were plotted to determine the low-temperature outputs on the basis of I-V characteristics at the time of discharge. A discharge at each of the current values was performed after adjustment to a state of charge of 50%.

TABLE 1

| | | Concentrations of additives (mol/L) | | | | |
| | | LiBOB | | $LiPF_2O_2$ | | |
| Battery | Additives | Before charge and discharge | After charge and discharge | Before charge and discharge | After charge and discharge | Low-temperature output |
| --- | --- | --- | --- | --- | --- | --- |
| A | LiBOB + $LiPF_2O_2$ | 0.1 | N.D | 0.05 | 0.05 | 140 |
| Z1 | None | — | — | — | — | 100 |
| Z2 | LiBOB | 0.1 | N.D | — | — | 127 |

As shown in Table 1, it was found that the temperature characteristics were improved in the battery A, in which LiBOB and $LiPF_2O_2$ were added as additives (the relation between the concentration of the two additives was LiBOB>$LiPF_2O_2$ before the charge and discharge and LiBOB<$LiPF_2O_2$ after the charge and discharge), compared to the battery Z1 with no additive added and the battery Z2 with only LiBOB added as an additive. This shows that the configuration of the invention improves the low-temperature characteristics after the charge-discharge cycle test.

The experiment above performed a constant voltage charge in a charge and discharge to examine the concentration of LiBOB or other matters. However, the constant voltage charge is not indispensable in view of forming a covering on the surface of the negative electrode active material.

The invention can be used for a driving supply of EVs and HEVs requiring high outputs.

The invention claimed is:

1. A method of manufacturing a nonaqueous electrolyte secondary battery, the method comprising:
   forming an electrode assembly including a positive electrode plate and a negative electrode plate disposed with a separator interposed therebetween;
   arranging the electrode assembly and a nonaqueous electrolyte containing LiBOB (lithium bis(oxalato)borate) and $LiPF_2O_2$ (lithium difluorophosphate) inside an outer body; and
   configuring the concentration of the LiBOB to be larger than that of the $LiPF_2O_2$ before a charge and discharge and to be smaller than that of the $LiPF_2O_2$ after the end of the charge and discharge so that a covering is formed on the surface of a negative electrode active material.

2. The method of manufacturing a nonaqueous electrolyte secondary battery according to claim 1, wherein the charge and discharge is performed under a condition in which a constant current charge is performed to 4.0 to 4.3 V at a charging current of 0.05 to 10.0 It and then a discharge is performed to 2.0 to 3.0 V at a discharging current of 0.05 to 10.0 It.

3. The method of manufacturing a nonaqueous electrolyte secondary battery according to claim 1, wherein the concentration of the LiBOB before the charge and discharge is 0.05 to 0.15 mol/L.

4. The method of manufacturing a nonaqueous electrolyte secondary battery according to claim 3, wherein the concentration of the LiBOB after the end of the charge and discharge is less than 0.01 mol/L.

5. The method of manufacturing a nonaqueous electrolyte secondary battery according to claim 3, wherein the concentration of the $LiPF_2O_2$ after the end of the charge and discharge is 0.01 to 0.1 mol/L.

6. The method of manufacturing a nonaqueous electrolyte secondary battery according to claim 1, wherein the proportion of the nonaqueous electrolyte to a negative electrode active material contained in the negative electrode plate is 0.5 to 2.5 mL/g.

7. The method of manufacturing a nonaqueous electrolyte secondary battery according to claim 1, wherein the negative electrode plate contains carbon as a negative electrode active material and the positive electrode plate contains a lithium-containing transition metal compound as a positive electrode active material.

8. The method of manufacturing a nonaqueous electrolyte secondary battery according to claim 7, wherein the negative electrode active material contains graphite as the carbon and the positive electrode active material contains lithium-nickel-cobalt manganese oxide as the lithium-containing transition metal compound.

9. The method of manufacturing a nonaqueous electrolyte secondary battery according to claim 1, wherein the nonaqueous electrolyte further comprises $LiPF_6$, the concentration of the $LiPF_6$ is larger than the concentration of the LiBOB.

* * * * *